United States Patent
Gross

[15] 3,635,390
[45] Jan. 18, 1972

[54] ELECTRONIC CONTROL CIRCUIT FOR AUTOMATICALLY FED MACHINES

[72] Inventor: Clarence R. Gross, Hastings, Mich.
[73] Assignee: Gulf & Western Industrial Products Company, Grand Rapids, Mich.
[22] Filed: Sept. 25, 1969
[21] Appl. No.: 870,830

Related U.S. Application Data

[62] Division of Ser. No. 698,657, Jan. 17, 1968, Pat. No. 3,534,897.

[52] U.S. Cl. ..................................228/8, 228/4, 318/466
[51] Int. Cl. ...........................................B23k 1/00, B23k 5/00
[58] Field of Search ........................228/4, 8; 113/8; 318/466

[56] References Cited

UNITED STATES PATENTS

| 3,527,125 | 9/1970 | Ferrier | 228/8 X |
| 2,773,465 | 12/1956 | Gedde | 113/8 |
| 2,458,008 | 1/1949 | Kruse | 113/8 |

Primary Examiner—John F. Campbell
Assistant Examiner—Robert J. Craig
Attorney—Meyer, Tilberry and Body

[57] ABSTRACT

There is provided an apparatus controlling an automatically fed machine having multiple feed stations and a conveyance path along which workpieces are fed. A pulse generator operatively connected to the apparatus generates a plurality of timing pulses in timed relationship with feeding of the workpieces, and a multiple of workpiece detection sensors produce signals when detecting workpieces in several of the stations, such signals being stored in associated memory units in time relationship with several of the timing pulses. An output signal from one of the memory units impulses a shift register, which is then stepped for each machine cycle by one of the timing pulses. An output signal from the shift register is adapted to energize a work-performing apparatus should the workpieces be conveyed properly, and another output signal from the shift register is compared in a comparator with an output signal from the other of the memory units. Should the two comparator signals agree in point of time, an output signal from the comparator will energize a machine control that keeps the machine operating. Should the two signals not compare in point of time, both the work performing apparatus and the machine control remain deenergized, and the machine stops.

8 Claims, 7 Drawing Figures

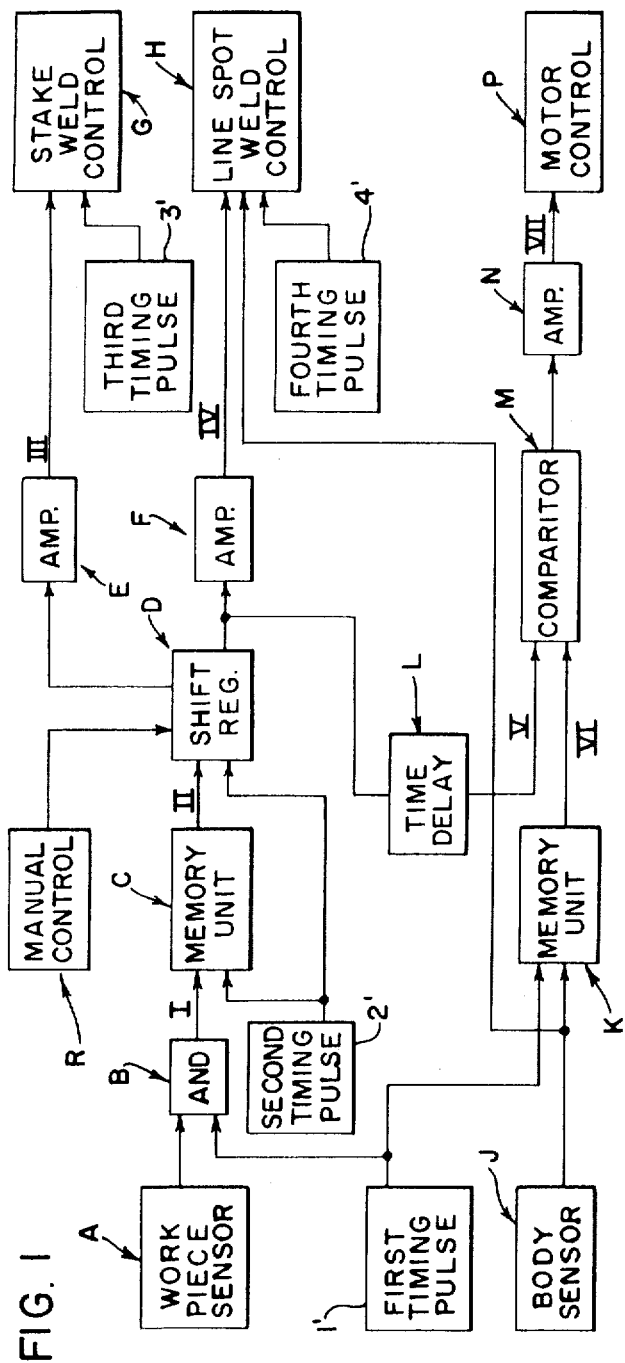
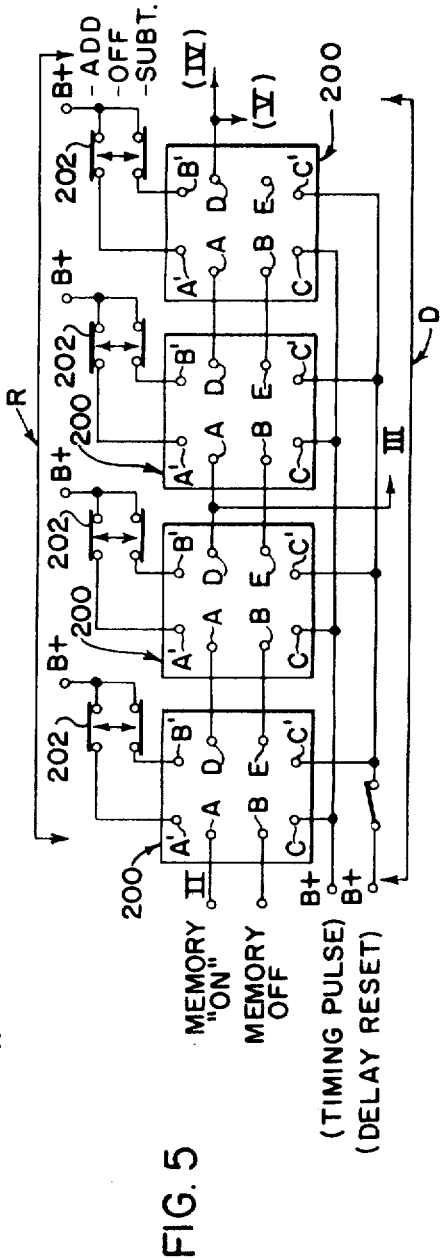
FIG. 1
FIG. 5
INVENTOR.
CLARENCE R. GROSS

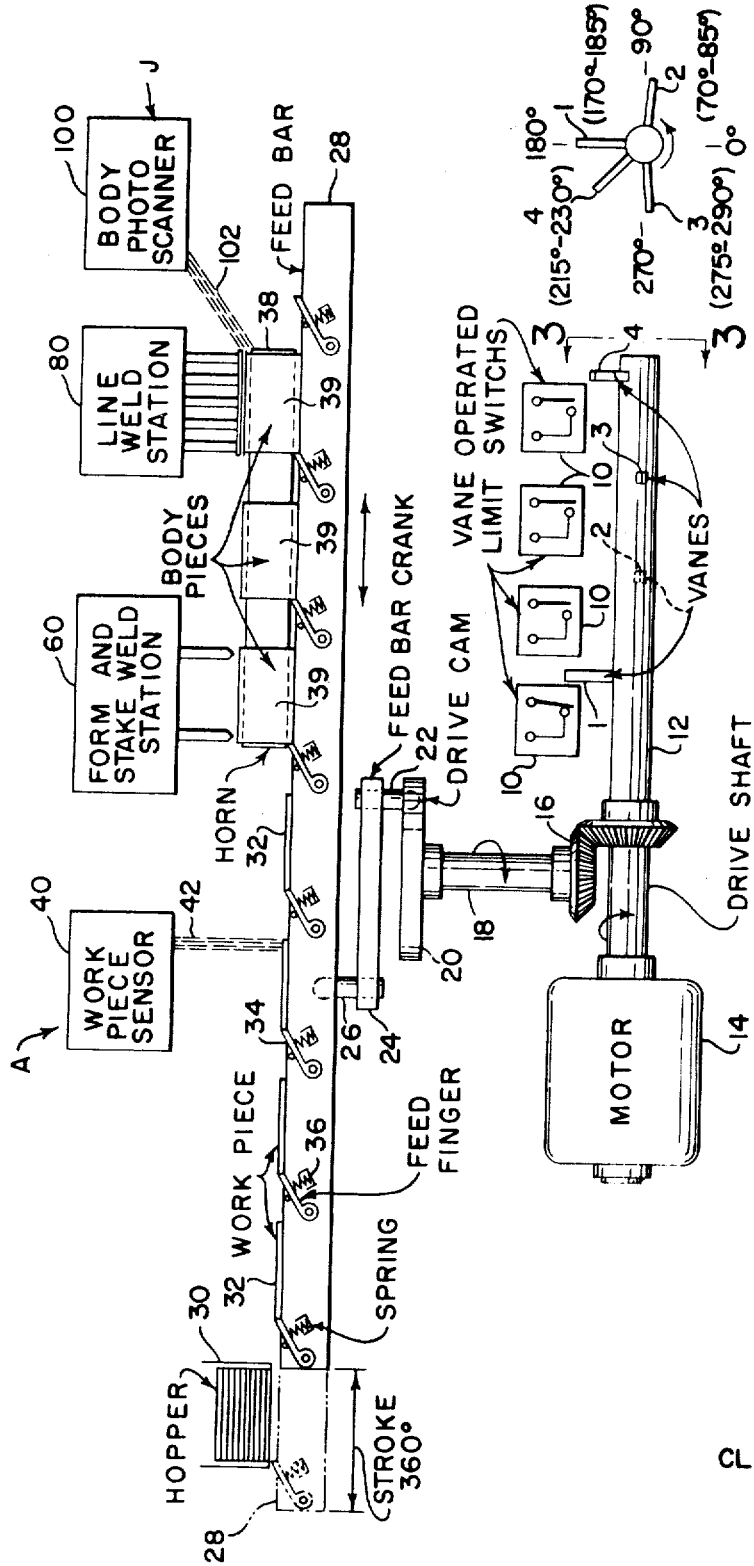

INVENTOR.
CLARENCE R. GROSS

ELECTRONIC CONTROL CIRCUIT FOR AUTOMATICALLY FED MACHINES

This application is a division of U.S. Pat. Application Ser. No. 698,657 filed Jan. 17, 1968, and now U.S. Pat. No. 3,534,897 issued Oct. 20, 1970.

This invention relates to control circuits for automatic machines and, more particularly, to circuits for controlling material being transported through automatically fed machines when a number of malfunctions occur, characterized by misfeeding, jamming or generally improper material movement.

The present invention is particularly directed to a control circuit for a can body making machine and will be discussed with particular reference thereto; however, the invention has somewhat broader applications and is adaptable for use whenever material being automatically fed through a machine is to be controlled.

A number of electronic control circuits for monitoring material movement and controlling automatic fed machines have been directed in the past to such as, laundry control, bottle recognition apparatus, and linear measurement systems. All of these prior art control circuits have been limited to single station, or single item control, and not to control of automatic fed machines providing for continuous control of each item being fed through multiple work stations within the machine in operation.

The control circuit of the type herein described is particularly directed to machines for forming lap welded aluminum can bodies, as is described in patent application "Method And Machine For Forming Lap Welded Aluminum Can Bodies," U.S. Ser. No. 573,971, filed on Aug. 22, 1966, now abandoned, assigned to the assignee of the present invention, and which is incorporated by reference herein.

Application No. 573,971 is directed to a machine and process for making can bodies out of aluminum. It is directed to an ultrasonic welding process to produce can bodies out of aluminum, at a high production rate, with the can body thickness dependent upon the thickness of the blank used, and with a desirable final appearance. Prior art processes for making can bodies out of aluminum created can bodies of variable thicknesses, poor welded or soldered joints and discolored appearances.

The apparatus disclosed in U.S. Pat. application, Ser. No. 573,971, forms a generally cylindrical can body from a flat aluminum blank, transporting the material fed from a hopper through several idle stations and to several work stations where the forming and then the welding is done. The can body is formed with overlapped edges, and then stake welded and finally line spot welded by an ultrasonic weld process before being ejected from the machine. The ultrasonic welders used are two frequency converters with controls, having a capacity of 2,000 watts and 1,000 watts, which are marketed by Sonobond Corporation.

In accordance with the present invention there is provided an apparatus for controlling an automatically fed machine wherein workpieces are transported along a conveyance path and a means is responsive to the entrance of each said workpiece into an input station for storing a memory of the entrance, a register means is responsive to the transportation of each workpiece through the machine for controlling a work-performing apparatus to perform work on each workpiece in the event each workpiece is being transported through the machine, another means is responsive to the presence of each workpiece at an output station for storing a memory of the presence thereof, and a comparator means senses if a difference, in point of time, in the outputs of the register means and the output responsive means exists, and if such a difference exists, the comparator means stops the machine.

The primary object of this invention is the provision of a control apparatus for an automatically fed machine.

Another object of this invention is the provision of an electronic control circuit for an automatically fed machine.

Another object of this invention is the provision of a control circuit for stopping the machine and the welding process if material is not present at the welding station of the machine.

Another object of this invention is the provision of a control circuit having a shift register to indicate where material is within the machine, and a differential comparator to stop the machine and welding process in the event the material has not been fed through the machine.

These and other objects of the invention will become apparent from the following description of a specific example embodying the invention and the attached claims when taken in conjunction with the accompanying drawings illustrating the described specific example embodying the invention in which:

FIG. 1 is a block diagram of the embodiment of the control apparatus of the present invention;

FIG. 2 is a diagrammatic representation of the transportation of the material through the machine in conjunction with the control apparatus;

FIG. 3 is a partial sectional view taken along line 3—3 of FIG. 2 and looking in the direction of the arrows of the drive shaft with attached vanes, illustrative of the timed relationship of the limit switch operating vanes with the feeding of the material through the machine;

FIG. 5 is a schematic of the shift register and manual controls for each state of the shift register as shown in FIG. 4;

GENERAL DESCRIPTION

Figure 4:
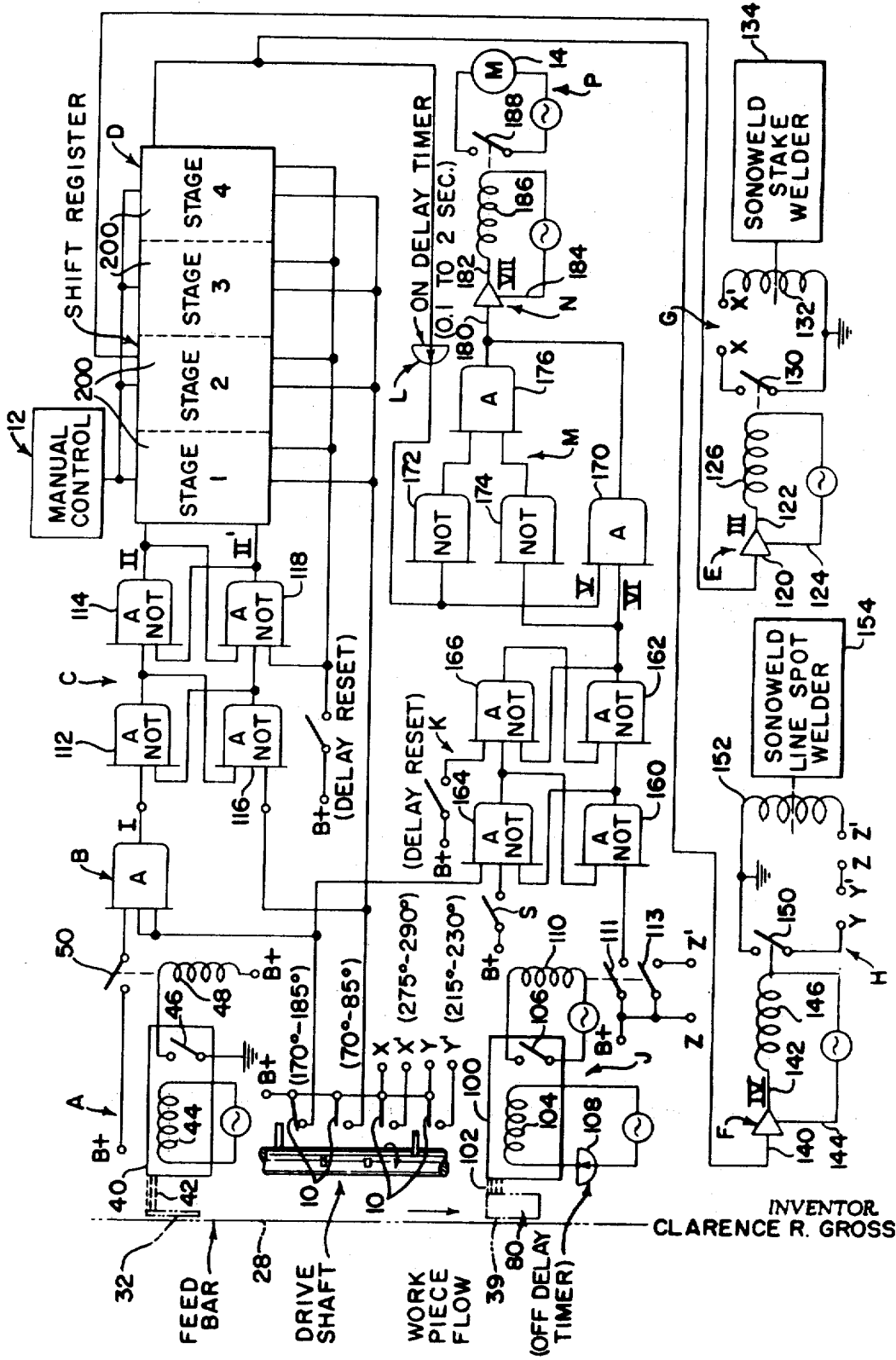
FIG. 4 is a schematic circuit of the block diagram of FIG. 1.

Referring now to the drawings which are for the purpose of illustrating a preferred embodiment of the invention and not for the purpose of limiting the same, a block diagram of the control apparatus of the present invention is illustrated in FIG. 1.

As illustrated in FIG. 1, workpiece sensor A is adaptable for sensing the feeding of a workpiece into the input station of the machine under control. An output from workpiece sensor A is "Anded" with a first timing pulse 1' in a standard AND circuit B. The output from AND circuit B, shown as I, is used to control a memory unit C, in the event a workpiece has been sensed by a workpiece sensor A. Memory unit C has an output, shown as II, which is designed to prime the shift register D.

Shift register D comprises a plurality of bistable flip-flops, each flip-flop of the design, such, that it will turn "on" with a set pulse if primed with a prime output from a preceding flip-flop, and it will turn "off" with a set pulse if it has not been primed with a prime output from a preceding flip-flop.

The prime output II from memory unit C is designed to prime the first flip-flop of shift register D, and a second timing pulse 2' is used to turn "on" any flip-flop that has been primed by the preceding stage or to turn "off" any flip-flop that has not been primed by the preceding stage. The flip-flops used in shift register D will be explained in greater detail subsequently. As is shown in FIG. 1, an output from shift register D is amplified in amplifier E so as to produce a control output III, the function of which is to control a stake weld control unit G in conjunction with a third timing pulse 3'.

A second sensor, body sensor J, has an output designed to set a second memory unit K some predetermined time later, after a workpiece has been sensed by workpiece sensor A. The correlation between workpiece sensor A and body sensor J will be explained subsequently. First timing pulse 1' also has the function of resetting memory unit K only in the event that body sensor J has not sensed a workpiece at some predetermined point within the machine being controlled. In the event that memory unit K has been set by body sensor J, such memory unit K will produce output VI which is taken to a comparator M. A second output from shift register D is taken through time delay L to produce an output V, which is also taken to comparator unit M. The purpose of comparator M is to insure that both inputs V and VI are present within the machine at the same time, so as to produce an output signal. This output signal is passed through amplifier N to produce output VII, which is taken to a motor control unit P, to keep the apparatus being controlled in the "run" status. Should there be no output VII from amplifier N, motor control unit P will be deenergized and the apparatus being controlled will be stopped.

The second output from shift register D is also taken through amplifier F to produce an output, shown as IV, which is taken to a line spot weld control unit H. The output from body sensor J is also taken to line spot weld control unit H, where, in conjunction with a fourth timing pulse 4' and output IV, the three inputs to line spot weld control H energize the weld control equipment at line spot control H. Manual control R is used for setting or resetting the individual flip-flops that make up shift register D, in the event of a power failure, or in the event that the workpieces being transported through the apparatus under control do not progress through the machine in the desired sequence.

FIG. 2 is illustrative of an apparatus that can be controlled by the present invention. In FIG. 2, vanes 1, 2, 3 and 4 coact with vane-operated limit switches 10, which may be standard magnetically operated reed switches for the purpose of this invention, to produce the first, second, third and fourth timing pulses, 1'-4' as shown in FIG. 1. Vanes 1 through 4 are shown attached to a drive shaft 12 which is driven by a motor 14 of the apparatus being controlled. Also attached to shaft 12 is a vertical bevel gear driving a horizontal bevel gear for rotating a second shaft 18 in timed relationship with shaft 12. Attached to rotating shaft 18 is a drive cam 20 with a pivot stud 22 mounted in pivotal arrangement with drive cam 20 and also with one end of a feed bar crank 24. A second pivot stud 26 is attached in pivotal arrangement to the other end of feed bar crank 24 and also with a feed bar 28. Feed bar 28 is reciprocated in an oscillatory manner under the control of pivot stud 26 and feed bar crank 24. FIG. 2 shows feed bar 28 in its full forward movement. The timing relationship between the feed bar 28 and drive shaft 12 is such that for each full oscillatory movement of feed bar 28, drive shaft 12 will rotate through one revolution, or 360°. Thus, it is seen that the full oscillatory movement of feed bar 28 is equivalent to 360° of machine time.

FIG. 2 is generally illustrative of the reciprocating movement imparted to a feed bar 28 of a welding apparatus. Hopper 30 is shown containing workpieces 32 which are deposited upon feed bar 28 in a manner well known in the welding industry. As workpieces 32 are fed onto feed bar 28 from hopper 30 they are held in place by means of transporting devices, generally illustrated by feed fingers 34 and compression springs 36. The transporting devices, thus, have been designed to move under the workpieces as the feed bar 28 is returned to its far left position. Not shown in FIG. 2, are clamping devices which are also well known in the welding industry, for retaining workpieces 32 in the machine position to which they have been transported as feed bar 28 returns to its leftmost position.

The welding apparatus, as illustrated in FIG. 2, may be composed of any number of work stations, and not necessarily the number that is illustrated in FIG. 2. However, to best illustrate this invention, seven work stations have been shown, the last three stations illustrating how a generally flat workpiece 32 has been formed into a can body 39 around a horn 38, a process that is well known in the art.

Workpiece sensor 40 is generally illustrative of the workpiece sensor A as was shown in FIG. 1. Workpiece sensor 40 generally senses workpiece 32 by means of a photoelectric beam 42 in a station that could be considered as an input station. A form and stake weld station 60 is illustrative of the position of a body piece 39 which is about to be operated upon by stake weld control G as shown in FIG. 1. Line weld station 80 is illustrative of the position in the apparatus where a body piece 39 is about to have work performed upon it by line spot weld control H, as shown in FIG. 1. Body photo scanner 100 is generally illustrative of the body sensor J of FIG. 1, and the photoelectric beam of body scanner 100 is shown as beam 102. Thus, it is seen that should any of the workpieces not be transported through the apparatus under control in the preferred sequence, an output from body photo scanner 100 can be utilized to control motor 14, and an output from workpiece sensor 40 can be utilized for setting a memory unit, as illustrated by memory unit C in FIG. 1.

FIG. 3 is a partial sectional view along line 3—3 of FIG. 2, illustrating the timed relationship of the vanes which are attached to shaft 12, and therefore rotate at the same speed as shaft 12. FIG. 3 illustrates the timing duration that the normally open points of the vane operated limit switches 10 are closed to give the timing pulses indicated in FIG. 1, and also their relationship with one another during the machine cycle.

Illustrated in FIG. 4, is a schematic diagram of the control circuit shown in block diagram form in FIG. 1, which is operative to control a machine forming lap-welded aluminum can bodies, as disclosed by U.S. application No. 573,971, and assigned to the assignee of this invention.

In FIG. 4 the motor 14, feed bar 28, workpiece 32 and body piece 39 are shown as illustrative of the drive mechanism and material movement through the apparatus under control. The sensors 40 and 100 in the preferred embodiment shown, are photoelectric scanners of the type, MEK-55-SA10-AE, with sensor 40 using a transistorized amplifier, MEK-55-AA10-A, and sensor 100 using a transistorized amplifier, MEK-55-AC10-A, all units being manufactured and sold by Machinery Electrification, Inc., Northboro, Mass. The indicated scanners are of the type usable with 115 v., 60 cycle AC and which incorporate a relay, with normally open (N/O) points, such that the relay is energizable when reflected light reaches a photocell within the scanner unit. An additional feature of the scanner used for sensor 100 is the built-in delay unit wherein the energized relay will remain energized only for a predetermined time upon the sensing of a reflecting object and then will become deenergized, necessitating the movement of the reflecting object from beneath the photo beam before the sensing relay can be energized again. Should the reflecting object not move out of the reflecting beam, the sensing relay will not become energized again, thus permitting object movement sensing out of the particular machine station as well as object movement into the particular machine station.

The Sonoweld transducers, or frequency converters, are converters specifically manufactured for ultrasonic welding, and are manufactured by the Sonobond Corporation, West Chester, Penna. The line spot frequency converter consists of five independent frequency converters rated at 2,000 watts, synchronized and balanced to furnish 10 kilowatts of power to the line spot ultrasonic welder. Two independent 1,000 watt frequency converters deliver the required power to the stake weld transducer. A control console houses the timing devices for the two frequency converter pulse intervals and relays that must be energized by attached equipment to initiate the welding processes.

Referring to FIG. 4, workpiece sensor A is comprised of photoelectric sensor 40 having beam 42, a relay 44 with normally open (N/O) points 46 wired to one end of the coil of another relay 48, whose other coil end is wired to B+. Relay 48 has N/O points 50, with the N/O point connected to B+ and the operating point connected to one input of an AND-gate B. The other input of AND-gate B is wired to the first timing pulse (170°-185°), which is generated when vane 1 passes in close proximity to a magnetically operated vane switch 10. The output of AND-gate B is used as the prime input I to an ON input unit 112 of memory unit C.

Memory unit C is an OFF-RETURN MEMORY of the type shown and described in General Electric Publication BPC-B53D, pages 2-15, entitled "Transistorized Static Control," which uses four AND-NOT units to store a binary "1" signal. A standard output unit 114 of memory unit C has an output signal wired as the prime input II to the first stage of a shift register D. A B+ power "on" reset is wired to one input of a NOT output unit 118, and a reset from a second timing pulse (70°–85°) is wired to one input of an OFF input unit 116. The second timing pulse is generated when vane 2 passes in close proximity to another vane operated switch 10.

Shift register D is a series set-series add memory register having four stages, in the preferred embodiment illustrated, but it can be appreciated that the number of stages employed is dependent upon the requirements of the apparatus being controlled. Each stage is a STEP MEMORY unit of the type shown on pages 2–66 through 2–69 of the previously referred to G. E. publication,. The details of shift register D, in conjunction with manual control R will be subsequently explained. However, for our present description, each stage is a binary operated flip-flop having prime and inhibit inputs, prime and inhibit outputs indicative of an "ON" or an "OFF" state, respectively, with a step pulse and a reset pulse to set the flip-flop to the "ON" or "OFF" state dependent upon the state of the inputs. The second timing pulse (70°–85°) provides a stepping pulse for shift register D for every 360° of machine operation. A power "on" reset from B+ wired through N/O points which close after a short power "on" delay, sets each stage to the "off" state at the start of machine operation.

An output from stage 2 of shift register D is wired to an AC amplifier E, of the type shown on page 2–49 of the previously referred to G. E. publication, with an input 120 and terminals 122 and 124 connecting an AC power source to stake weld control G. The output of amplifier E, shown as III, energizes a coil of a relay 126 in stake weld control G. Relay 126 closes its N/O points 130, when energized. The N/O points 130 are wired in series with a third timing pulse (275°–290°), indicated by lines X–X', and the coil of a relay 132, so as to initiate the operation of the stake weld transducer 134. A second output taken from the fourth stage of shift register D is wired through a like AC amplifier F to produce output IV. Amplifier F has an input 140 and terminals 142 and 144 connecting an AC power source across the coil of a relay 146 of line spot weld control H. Relay 146 has N/O points 150 connected in series with a fourth timing pulse (215°–230°), indicated by lines Y–Y', and lines Z–Z' and a relay 152 so as to initiate the line spot weld transducer 154. The lines Z–Z' are wired across N/O relay points, as will be explained subsequently.

Body sensor J is comprised of photosensor 100 with light beam 102, photoelectric relay 104 with N/O points 106 and time delay 108, as previously explained. The N/O points 106 of sensor 100 are adapted to connect an AC power source across the coil of a relay 110, having N/O points 111 and 113. B+ is wired to the operating point of N/O points 111 and 113 and the N/O point of points 111 is wired as an input to memory unit K. The N/O points 113 are wired to lines Z–Z', connected in series control circuit of control H, as previously explained.

Memory unit K is an OFF-RETURN MEMORY similar to memory unit C. The N/O point of points 111 is wired to ON input unit 160 of memory K. The standard output unit 162 has an output signal wired as input VI to comparator M. First timing pulse (170°–185°) is wired into one input of an OFF input unit 164 as a reset. The power "on" unit reset (delay reset), through momentarily open contacts, puts B+ on an input to NOT output unit 166. A second reset, through switch S, puts B+ on an input to OFF input unit 164, to reset memory unit K after power "on" because sensor 100 operates relay 110 momentarily on power "on" to trigger memory unit K "on."

The output VI from memory unit K standard output unit 102 is wired to one input of an AND-gate 170 in comparator M. The second output from the fourth stage of shift register D is wired through time delay L and, as output V, is wired to the second input of AND-gate 170. Output VI is also connected to the input of a NOT-unit 174, and output V is also connected to the input of a second NOT-unit 172. The output of NOT-unit 174 is connected to an input of a second AND-gate 176 and the output of NOT-unit 172 is connected to the second input of AND-gate 176. The outputs of AND-gates 170 and 176 are commoned and connected as an input to amplifier N.

Amplifier N is identical to amplifiers E and F having an input 180, and terminals 182 and 184 connecting an AC power source across a coil of a relay 186 of motor control P. Relay 186 has N/O relay points 188 adapted to connect an AC power source across drive motor 14.

In FIG. 5, shift register D and manual control R are illustrated. Illustrated in FIG. 5 is the series set-series add binary shift register having four stages of STEP MEMORY flip-flops 200, as previously explained. The prime input of each stage 200 is depicted by A, and the inhibit input of each stage 200 is depicted by B. Wired to the prime input A of stage 1 is the output II of standard output 114 of memory unit C, and wired to the inhibit input of stage 1 is an inhibit output of memory unit C taken from the NOT output unit 118 of memory unit C.

Each stage 200 also has a prime output D, designating a binary "1" when the stage is set on "on," and an inhibit output E, designating a binary "1" when the stage is set "off." The prime outputs D and the inhibit outputs E of stages 1, 2 and 3 are wired to the prime input A and the inhibit input B of succeeding stages 2, 3 and 4, respectively. Prime output D of stage 4 is wired as an input to amplifier F and also to time delay L. Prime output D of stage 2 is also connected to the input of amplifier E. A positive stepping pulse is wired to a step input C, of each stage.

In FIG. 5, provision is made for manual setting of the flip-flops in each stage 200 by providing auxiliary prime input A' and auxiliary inhibit B'. Manual control R consists of four, three position normally closed (N/C) double pole switches 202, having "Add," "Off," and "Subtract" positions. One pole of the "Add" and "Subtract" positions of the switches 202 are commoned and wired to B+. The second pole of each "Add" position of the switches 202 is wired to auxiliary prime input A', whereas the second pole of each "Subtract" position of the switches 202 is wired to auxiliary inhibit input B'. A positive delay reset is wired to reset input C' through N/O delay points that close after a short power "on" delay setting each stage "off."

Figure 6:
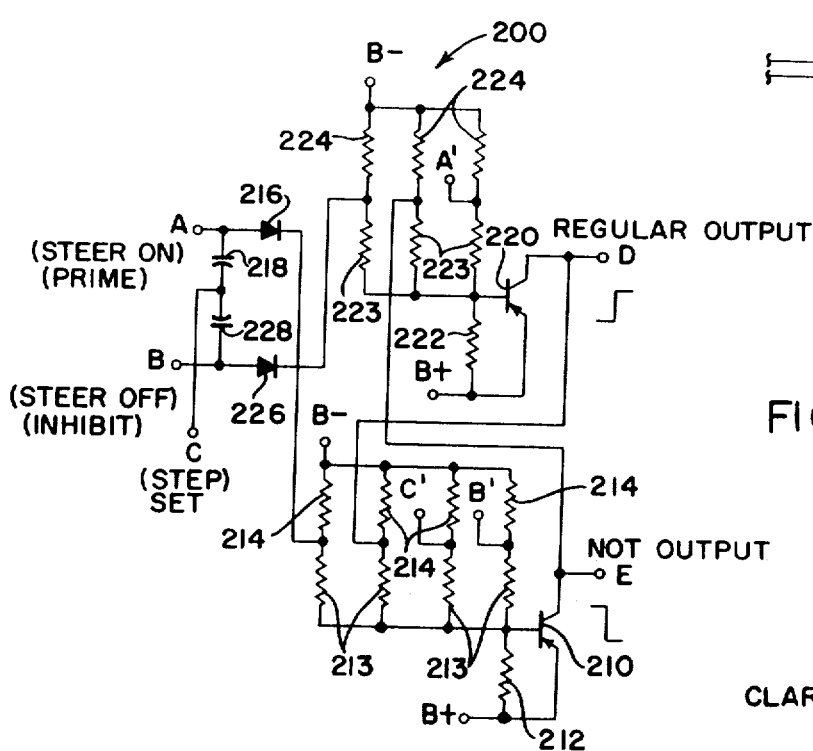
FIG. 6 is a wiring diagram of each stage of the shift register, with the appended terminals thereto; and, FIG. 7 is a cut away view illustrative of the body sensor and pickup method used at the line weld station of the embodiment of FIG. 1.

In FIG. 6, a STEP MEMORY unit 200 with a steering network consisting of prime input A, inhibit input B and step input C is shown, such as illustrated on page 2–68 of the previously designated G. E. publication with the designated inputs and outputs as detailed for FIG. 5. Two PNP-transistors, 210 and 220, with associated circuitry that comprises AND-NOT units (similar to those shown on page 2–6 of the aforementioned G. E. publication) are connected in a latch back arrangement so as to form the flip-flop portion of the STEP MEMORY unit.

Each transistor 210 and 220 has its respective emitter connected directly to B+, and also to its respective base through biasing resistors 212 and 222, respectively. The respective bases of transistors 210 and 220 are wired to B− through a plurality of paralleled series resistor combinations 213 and 214, and 223 and 224. The collector of transistor 210 is wired as inhibit output (NOT output) E and also as a latch back to the junction of resistors 223 and 224 of the second series combination of resistors wired to the base of transistor 220. The collector of transistor 220 is wired as prime output (Standard Output) D and also as a latch back to the junction of resistors 213 and 214 of the second series combination of resistors wired to the base of transistor 210.

Prime input A is wired through the anode of a diode 216 to the junction of resistors 213 and 214 of the first resistor series combination, reset input C' is wired to the junction of resistors 213 and 214 of the third resistor series combination, whereas auxiliary inhibit input B' is wired to the junction of resistors 213 and 214 of the fourth resistor combination, all such combination of resistors having one end connected to the base of transistor 210, and the other end connected to B−.

Inhibit input B is connected through the anode of a diode 226 to the junction of resistors 223 and 224 of the first resistor series combination, and auxiliary prime input A' is wired to the junction of resistors 223 and 224 of the third resistor series combination, all such combinations of resistors having one end connected to the base of transistor 220.

Step timing pulse C is connected to the anodes of diodes 216 and 226 through two charging capacitors 218 and 228, respectively.

Figure 7:
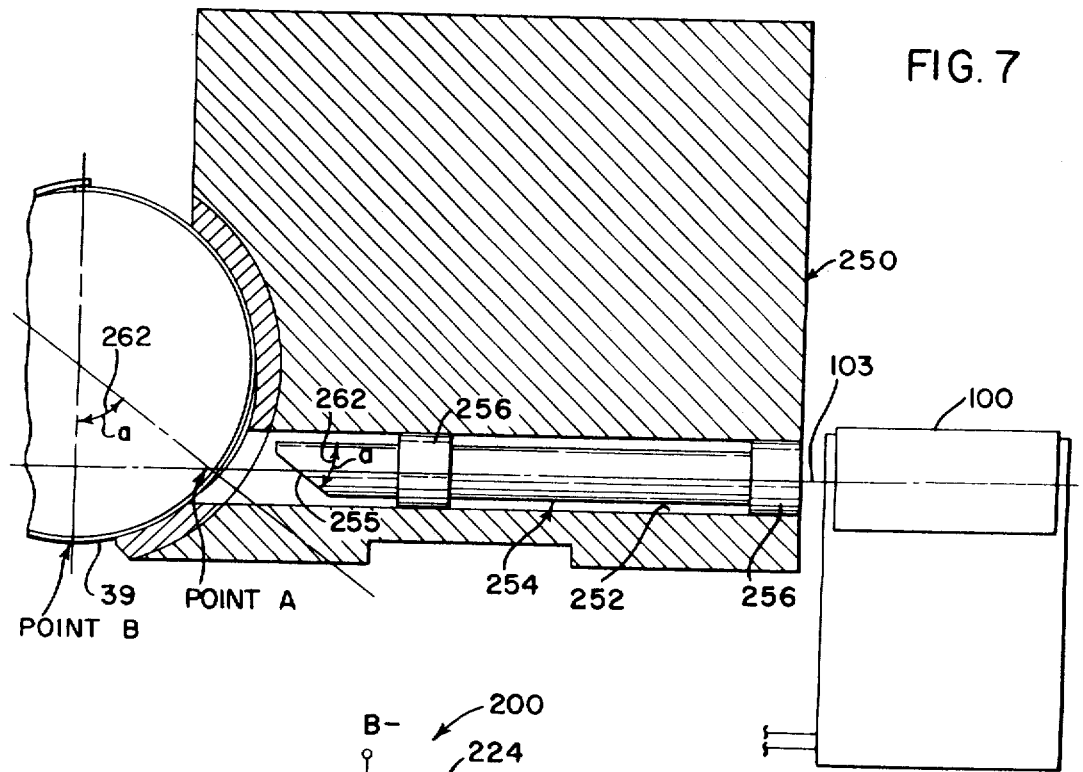

In FIG. 7, a cut away view of the body sensor J of FIG. 1 is shown in its preferred embodiment. A clamping block surrounding body piece 39, has a round horizontal access bore 252 running from the outer surface of block 250 to the inner curved surface where the block 250 surrounds the outer curved surface of body piece 39. A round elongated rod 254 is inserted in bore 252 and supported by bushings 256. Photosensor 100 is mounted so that the center line 103 of light beam 102 of photosensor 100 and centerline of elongated rod 254 are coincident. This centerline 103 and a diameter of body piece 39 coincide at some point A on the outer surface of body piece 39. Radii drawn from point A and from a lower perpendicular diameter point, point B, define an angle 262, designated by $a$. An inner tip 255 of rod 254 is cut off at an angle corresponding to angle 262, and rod 254 is adjusted longitudinally within bore 252 to permit photosensor 100 to sense the reflected beam from body piece 39. Thus, bore 252 may be cut in block 250 in any horizontal position, on line with body piece 39, within block 250, and inner tip 255 of rod 254 is then cut off at angle 262, corresponding to the resultant angle $a$ created by the radii under discussion.

OPERATION

In FIG. 2, showing a representation of a typical machine employing the control apparatus of this invention, motor 14, when energized, drives shaft 12, and timing vanes 1–4 and vertical bevel gear 16, all of which are fixedly attached to shaft 12. A second bevel gear 16 causes shaft 18 to rotate, which, in turn, rotates drive cam 20. As drive cam 20 rotates, feed bar crank 24 is driven in an oscillatory motion by pivot pin 22. The feed bar crank 24 transfers this oscillatory movement to feed bar 28 by means of a second pivot pin 26. Timing vanes 1–4, of magnetic material, are attached to shaft 12 in a predetermined manner, as illustrated by FIG. 3, so as to have a timed relationship with the oscillatory movement of feed bar 28. As is shown by FIG. 2, magnetic timing vane 1 is attached to shaft 12 to cause deflection of the operating vane of a limit switch 10 so as to transfer the N/O points of switch 10 when the feed bar 28 has reached its maximum oscillatory movement to the right. Limit switch 10 is representative of a magnetically operated reed switch of any well-known type that closes N/O points when a vane having magnetic properties pass inclose proximity to the switch points.

Referring again to FIG. 2, workpieces 32 are fed from a feed hopper to feed bar 28, when feed bar 28 is in its left most oscillatory position. Typical of transport units employed for such machines are feed fingers 34 biased upward with compression springs 36 and which are designed to feed the workpieces 32 to the right when feed bar 28 is oscillated to the right, and then to depress so as to ride under the workpieces 32 (held in place by clamping means not shown, but which is well known in the art) as feed bar 28 is driven to the left. As workpieces 32 are fed to the right through the various machine stations, workpiece sensor 40 senses a workpiece 32 by means of a photobeam 42 at a station which can be considered an input station. This sensing of a workpiece 32 activates a memory, as will be detailed subsequently. Two cycles later the workpiece 32 has been transported to station 60 where it has been formed into body piece 39 around a horn 38, by a process well known in the art. This station 60 is designated as a form and stake weld station, for the body piece 39 is formed here and then work is performed in the nature of a stake weld by ultrasonic welders. Two cycles later, the staked body piece 39 should have been transported to an output station 80, known, as a line weld station, where work in the nature of ultrasonic line welding is done if the body piece 39 has been transported to station 80. If the stake body piece 39 should be defectively welded in the stake weld station, the staked body piece 39 may not be transported to station 80. Body sensor 100 in body photo scanner J is used to detect body piece 39 movement into station 80, and also body piece 39 movement out of station 80, as was previously explained.

Thus, it is seen in FIG. 2, that timing pulses 1–4′, workpiece 32 sensing, and body piece 39 movement are all achieved in timed relationship to the machine under control, and that drive power to motor 14 can be interrupted or controlled as desired.

FIG. 1 illustrates in block diagram form the preferred embodiment of this invention, whereas FIG. 4 is a schematic illustration of this invention. As a result, the detailed operation of this invention will be directed to FIG. 4.

As workpiece 32 is transported to the input station, at A, by feed bar 28, it is sensed by beam 42 of workpiece sensor 40, and relay 44 will become energized, closing N/O points 46 within sensor 40. When N/O points 46 close, relay 48 becomes energized to close N/O points 50 so as to put a binary "1" signal on an input of AND-gate B. Drive shaft 12 rotates magnetic vanes 1 through 4 in timed relationship to feed bar 28, as previously explained, so, as vane 1 passes in close proximity to its limit switch 10, the reed switch normally open points close and a binary "1" signal is put on the second input of AND gate B.

As is well known, an AND-gate is a circuit which has at least two inputs and one output. If both inputs are a binary "1," the output will also be a binary "1." Under all other conditions, the output will be a binary "0."

Consequently, with a binary "1" on both inputs of AND gate B, there is a binary "1," as output I, serving as an input to ON input unit 112 of memory unit C. As previously stated, memory unit C is in the form of an OFF-RETURN MEMORY, wherein a binary "1" to the ON input unit 112 produces a binary "1" output from unit 114. This OFF-RETURN MEMORY is of the type depicted on pages 2–15 of the aforementioned G. E. publication, wherein four AND-NOT units are wired in latch back fashion to constitute a memory unit. As soon as power is applied, units 112 and 116 produce a binary "1" output immediately, but the delay reset delays its output long enough to insure that output 118 turns "on." With units 112 and 116 both driving unit 118 with binary "1" signals, unit 114 cannot turn "on," so the standard output from unit 114 is left in the binary "0" condition. When a binary "1" input is fed into unit 112, unit 112 loses its binary "1" output, causing unit 114 to turn "on" and feed a binary "1" to a third input of unit 118, causing unit 118 to lose its binary "1" output. The loss of this binary "1" output from unit 118 removes the other binary "1" input to unit 114, insuring an output from unit 114 of a binary "1," regardless of the condition of unit 112, even if unit 112 should again have an output of a binary "1" by releasing the binary "1" input to it. The OFF-RETURN MEMORY can be turned "off" with a binary "1" input to OFF unit 116, resulting in turning "on" unit 118, giving a binary "1" output from unit 118 which in turn, turns "off" unit 114. Thus, the first binary "1" input, whether it is into ON unit 112 or into OFF unit 116, will take precedence as long as it is in the binary "1" state. For example, the binary "1" input into ON unit 112 removes the binary "1" output from ON unit 112 which in turn removes an input of a binary "1" to OFF unit 116. Once this binary "1" input to OFF unit 116 is removed, actuating the second timing pulse so as to produce a binary "1" input to OFF unit 116, has no effect. The first binary "1" input signal to the OFF-RETURN MEMORY locks out the effect of the second binary "1" input while the first binary "1" input is being maintained.

The binary "1" output from unit 114, output II, primes the first stage of shift register D, which is comprised of four bistable STEP MEMORY units 200, as previously described. These STEP MEMORY units 200 may take the form as shown on page 2–68 of the aforementioned G. E. publication, wherein a steering network is used in conjunction with a flip-flop composed of two AND-NOT units. Each STEP MEMORY unit 200 comprises one stage of the shift register D, and includes two PNP-transistors stages, as shown in FIG. 6, one transistor conducting while the other transistor is cut off. One condition of each unit is the normally "on" or binary "1" condition and the remaining condition being called the "off" condition, or the binary "0" condition.

Referring now to FIGS. 5 and 6, each stage of the binary shift register D is normally reset "off" with the B+ delay reset into the reset input C', causing transistor 210 to conduct, to produce a binary "1" condition at the NOT output E, and producing a binary "0" condition at the regular output D. With reference to both FIGS. 5 and 6, priming stage 1 transistor 210 with a binary "1" input into prime input A and a binary "0" input into inhibit input B, conditions the base of transistor 210 to turn the flip-flop within STEP MEMORY unit 200 "on" by conditioning the base of transistor 210 to cut transistor 210 "off," and also conditions the base of transistor 220 through diode 226 to permit conduction in transistor 220 as transistor 210 conduction is cut off. With the flip-flop of a memory unit 200 in this primed condition, a positive pulse into the step input C will put a strong momentary positive pulse onto the base of conducting transistor 210 through capacitor 218 and diode 216, driving the base strongly positive, reducing conduction through transistor 210, and causing the collector output to decrease. This decrease in the collector output of transistor 210 will be reflected to the base of transistor 220 through resistor 223 of the second series of resistor combinations to initiate conduction in transistor 230. As transistor 220 begins to conduct, the output from the collector of transistor 220 at the junction of the second series of resistors 213 and 214 will go more positive, placing a positive bias on the base of transistor 210. Through this regenerative action, transistor 210 is cut "off" and transistor 220 is driven into saturation, and the flip-flop within the memory unit 200 is changed from the "off" state to the "on" state or from the binary "0" state to the binary "1" state. The opposite condition of the flip-flop can be achieved by placing an inhibiting condition on input A (binary "0") and a priming condition on input B (binary "1") when the positive timing pulse is impressed on step input C.

The desired state of each step memory unit 200 can be manually achieved with auxiliary prime input A' and auxiliary inhibit B' and the manual control R, by manually operative switches 202 removing a binary "1" signal from the particular terminal involved. For an ADD operation in a particular stage, it is only necessary to manually operate switch 202 for the STEP MEMORY unit 200 involved, so as to remove the B+ to the A' terminal (this puts a negative on the base of transistor 220) to cause conduction in transistor 220 and thus produce a binary "1" output at output D, signifying an "on" condition for the flip-flop within the STEP MEMORY unit 200 that is being set. In the same manner, a STEP MEMORY unit 200 can be reset "off" for a SUBTRACT operation, by operating a switch 202 so that the B+ into the auxiliary input B' terminal is removed, causing the base of transistor 210 to go negative to drive transistor 210 into conduction, thus producing a binary "1" signal at NOT output E. Thus, the flip-flop within the STEP MEMORY unit 200 can be set to the desired state through the loss of a binary "1" signal to the particular terminal that is connected with the base of the transistor which it is desired to cause to conduct, and thus, to produce the binary "1" output therefrom.

Therefore, priming the input to stage 1 with a binary "1" prime input II into prime input A and an inhibit input into input B, will condition stage 1 to change from its power "on" reset binary "0" state to a binary "1" state when a positive timing pulse is impressed upon step input C. Turning the first state "on" will prime the second stage, and when the next positive timing pulse is impressed on the commoned step input C, the second stage will be changed from its normally power "on" reset binary "0" state to a binary "1" state. This process will continue, regardless of how many stages are employed, with each preceding stage priming each succeeding state. Also, it will be appreciated that stage 1 can be primed continuously for every machine cycle, and thus permit shift register D to be set in timed relationship with each workpiece 32 that is fed into the machine input station, at A.

Referring again to FIG. 4, as stage 2 of shift register D is turned "on," a binary "1" output is fed to an input 120 of amplifier E, which is a one ampere output amplifier, controlling AC power to a particular load. Such an amplifier can take the form of the AC output amplifier as shown on page 2–49 of the aforementioned G. E. publication. The terminals 122 and 124 permit the AC power source to be connected across the coil of relay 126 in the form of output III. Energizing the coil of relay 126 closes normally open contact points 130, and when third timing pulse (275°–290°) occurs, a series circuit is completed through lines X–X' and the coil of relay 132. Energizing the coil of relay 132 will initiate the self-contained timing controls, as previously explained, incorporated in the ultrasonic welding equipment 134. The timing control of welding equipment 134 thereafter control the timed operation of the welding process for stake welding the body piece 39.

As the body piece 39 is transported by feed bar 28 through the machine under control, the memory unit C is reset for each machine cycle by second timing pulse (70°–85°), and set by first timing pulse (170°–185°) for each workpiece 32 sensed by sensor 40 as each workpiece 32 is fed into the machine under control. Second timing pulse (70°–85°) also steps the shift register D in timed relationship with each workpiece 32 being transported through the machine.

As a particular body piece reaches the output station 80, shift register D should have a binary "1" on the output of stage 4 to correspond to the position of body piece 39 at output station 80. Body sensor 100 through beam 102 senses a body piece 39 as it is moved into output station 80. Beam 102, sensing a body piece 39, energizes the coil of relay 104, closing normally open points 106 within sensor 100. Closing normally open points 106, connects an AC power source across the coil of relay 110, energizing the coil to close two normally open contacts 111 and 113. The closing of normally open contacts 111 feeds B+, or a binary "1," to ON input 160 of memory unit K. Memory unit K is an OFF-RETURN MEMORY similar to memory unit C. Putting a binary "1" on input 160 causes a binary "1" output from unit 162, and as the unit is latched back through appropriate wiring, as previously explained, the binary "1" output from unit 162 appears as output VI into AND-unit 170 of comparator M.

Closing the normally open points 113, places the B+, by means of wiring Z–Z' in the controlled circuit of line spot control H. As previously stated, the fourth stage of shift register D should have a binary "1" output at this time. The binary "1" output from the fourth stage of shift register D biases input 140 causing an output from amplifier F in the form of IV causing an AC power source to be impressed across the coil of relay 146 by means of terminals 142 and 144. Energizing the coil of relay 146 causes normally open point 150 to close, completing a circuit across Z–Z' (N/O) points 113) and Y–Y', when fourth timing pulse (215°–230°) appears across Y–Y' to energize the coil of relay 152 so as to initiate the timing mechanism within line spot control H welding apparatus 154. Therefore, it should be apparent that welding apparatus 154 will not be energized should a body piece 39 not be sensed by sensor 100 moving into station 80 when the fourth stage of shift register D has a binary "1" output. Also, should body piece 39 not be transported out of welding station 80, no welding will be permitted on the next machine cycle by welding apparatus 154, because the time delay 108 incorporated within sensor 100 will cause the coil of relay 104 to deenergize after a predetermined time, and thus cause normally open relay points 113 to open, and remain open, and thus interrupt the control circuit within line spot control H.

The comparator M compares the output signal from the last stage of shift register D with the setting of memory unit K, to insure that the shift register D stepping and the workpiece 32 and body piece 39 transportation coincide. Should the output signals not compare in point of time, the machine under control is stopped.

Again, referring to FIG. 4, a binary "1" input to ON input unit 160 of memory K causes a binary "1" to be stored and a binary "1" appears as output VI at the output unit 162. A binary "1" from the fourth stage of shift register D through a time delay unit L having an adjustable setting of point 0.1 to 2 seconds, appear as output V. This time delay unit L is necessary because the binary "1" output from stage 4 of shift register D appears earlier in the machine cycle than the binary "1" output from memory K and it is desired to compare the two output signals at one time. The machine under control normally operates at an operating speed necessary to transport five workpieces per second through the machine, so delay unit L is made adjustable within the range specified and also to provide for any loss of operating speed.

Binary "1" outputs V and VI are impressed upon AND-unit 170, producing a binary "1" output therefrom that is used as an input to output amplifier N. A binary "1" input into 180 of amplifier N produces an output VII across terminals 182 and 184 to energize the coil of relay 186. Energizing the coil of relay 186 closes the N/O points 188, placing an energizing AC power source across motor 14. Should either output V or VI not be a binary "1" when compared, no energizing output will appear from AND-unit 170, and the motor control circuit P will be deenergized and motor 14 will stop.

Provision is made in comparator M for the machine to be in the "run" mode when no material is being transported through the machine or has not yet been fed up to the output station under normal conditions. Both outputs V and VI should be in a binary "0" state at this time. The binary "0" of outputs V and VI are impressed upon NOT-units 172 and 174, respectively. The output signals from the NOT-units, under this condition, will both be a binary "1," inverting the binary "0" inputs. These binary "1" signals are impressed upon the two inputs of AND 176 so as to produce a binary "1" input signal into output amplifier N, and thus energize the motor control circuit P as before, Thus, it is seen that motor control P will remain energized as long as a binary "1" input signal is present at the input to output amplifier N.

The reset to memory unit K has two forms. The manual reset from switch S putting a B+ on an input into the OFF unit 164, is necessary after power "on," because body sensor 100 is triggered "on" on power "on," which in turn triggers memory K "on." Therefore, memory unit K must then be reset "off" to permit normal operation. For operation after the manual reset, first timing pulse (170°–185°), putting a B+ on an input into OFF unit 164 of memory unit K, will reset the memory unit only in the event body sensor 100 is not sensing a body piece 39 moving into output station 80. This is because the first binary "1" input into memory unit K takes precedence as long as such binary "1" input is available, as was explained for the operation of the similar memory unit C.

Referring now to FIG. 7, the body sensor apparatus J is shown in a cutaway view. In the preferred embodiment shown, means had to be devised to sense body piece 39 within the solid clamping blocks necessitated by the ultrasonic welding process. The design of the machine under control did not permit sensing by means of a lever, nor by a sensing unit with a beam having a centerline on line with a diameter of body piece 39 within the block.

In the left hand clamp block 250 at line weld station 80, a round horizontal bore 252 is cut into block 252 from its outer surface to the inner curved surface surrounding body piece 39. An elongated plexiglass rod 254, having the property of directing light rays from one polished surface through the rod to a second polished surface, is inserted within bore 252 and retained within bore 252 by bushings 256. Body sensor 100 is mounted so that the centerline 103 of light beam 102 is coincident with the centerline of the elongated plexiglass rod 254.

The optics of the sensor 100 employed in the control apparatus of this invention permits only a 7° deviation of reflected light from the centerline of the return beam of the sensor to energize relay 104 within the sensor. Therefore, the construction of the apparatus under control required that the tip 255 of rod 254 be cut at a particular angle 262, defined as $a$. This angle $a$ is derived by defining point A on the outer surface of body piece 39. This is defined by the intersection of the centerline 103 of light beam 102 and the outer surface of body piece 39. A radius drawn from point A to the center of body piece 39, and a second radius drawn perpendicularly therefrom to a point B on the lower outer surface of body piece 39 define this angle $a$. Thus, bore 252 may be cut at any horizontal position in block 250, on line with body piece 39, to define the angle $a$. Cutting tip 255 of rod 254 at angle 262, defined as $a$, and adjusting rod 254 longitudinally within bore 252, brings the return path of beam 102 of sensor 100 within the the control limits of sensor 100 to sense a body piece 39 within the clamping block 250. The horn 38 (see FIG. 2) around which body piece 39 is formed, has a darkened spot on it on line with bore 252 and rod 254 to prevent erroneous reflected signals to be sensed by sensor 100 when no body piece 39 is present at this station of the machine.

Having thus described the preferred embodiment of the control apparatus, it will be obvious to one skilled in the art that various modifications may be made without departing from the invention as hereinafter defined in the claims.

I claim:

1. An apparatus controlling an automatically fed machine, said machine having a work-performing means and operating cycles and at least an input and an output station wherein workpieces are transported along a conveyance path so as to be fed into the input and the output stations, the combination comprising:

pulse generator means for generating a plurality of machine timing pulses, said pulse generator being operatively connected to said machine in timed relationship therewith;

first means for detecting the presence of each said workpiece at said input station and having a means for producing a signal when detecting the presence thereof, said first detecting means also having means for storing a memory of said workpiece presence signal in coincidence with the input thereto of one of said timing pulses, said memory means producing an output signal when such presence signal has been stored therein;

means fore registering the presence of each said workpiece in said machine upon a coincidence of the input into said register means of the output signal from said memory means and one of said timing pulses, said register means producing at least an output signal and having energizable means being energized by said output signal for controlling said work performing means so as to perform work on each said workpiece in the event each said workpiece is being transported through said machine;

second means for detecting the feeding of each said workpiece into said output station and having mans for producing a signal when detecting said feeding, said second detecting means also having means for storing a memory of said feeding signal, said second detecting memory means producing an output signal when said feeding signal has been stored therein; and comparator means for producing at least a control signal on the coincident input thereto of an output signal from said register means and from said second detector memory means, a said control signal energizing machine control means so as to permit the machine to continue to transport said workpieces along the conveyance path.

2. An apparatus as set forth in claim 1, wherein:

said generator means produces a first, second, third and fourth pulse for each operating cycle, said pulses having variable machine timings;

said first detection means including a first sensor in close proximity to said input station and producing said workpiece presence signal, said memory means having a signal detection means for producing an output signal upon the coincidence of the input thereto of said output from said first sensor and said first timing pulse and having a first memory storing said output signal from said signal detection means so as to produce an output signal when storing said output signal from said signal detection means therein;

said register means includes at least a first and last bistable flip-flop, each said flip-flop being interconnected with another said flip-flop and each having an off and an on state, said coincidence of said input signals into said register means serving to turn on said first bistable flip-flop; and said second detector means having a sensor in close proximity with said output station and producing an output signal only when detecting the feeding of a workpiece into said output station, said second detector memory means storing said feeding signal produced by said sensor so as to produce an output signal when said feeding signal has been stored therein.

3. An apparatus as set forth in claim 1, wherein said comparator means includes a differential amplifier for comparing an output signal from said register means with said output from said second detector memory means, said differential amplifier emitting a control signal energizing said machine control means in the event the two said outputs occur at the same point in time.

4. An apparatus as defined in claim 3, wherein said differential amplifier comprises a first and second logic AND-gate and a first and second NOT-unit, means for applying an output signal from register means to said first AND-gate and to said second NOT-unit to produce an inverted signal from said second NOT-unit, means for applying the output signal from said second detector memory means to said first AND-gate and to said first NOT-unit so as to produce an inverted signal from said first NOT-unit, means for applying said inverted output signals from said first and second NOT-units as input signals to said second AND-gate to produce a second control signal from said comparator on a coincidence of said inverted output signals, said second control signal energizing said machine control means when said machine is in an idle condition wherein no workpieces should have been fed into said output station.

5. An apparatus as defined in claim 4, wherein the signal detection means is a third AND-gate having means for applying a binary "1" signal to an input of said first memory means.

6. An apparatus as set forth in claim 5, wherein said first memory means includes a bistable memory unit storing said output signal from said signal detection means.

7. The apparatus as defined in claim 6, wherein said register means has a plurality of bistable flip-flops including said last means and the first flip-flop, means connecting the output leads of a preceding flip-flop to the input leads of a succeeding flip-flop, respectively, thereby to permit setting any flip-flop at any one time, said flip-flops developing a prime and inhibit binary "1" output signal on their output leads according to the set or reset state of said flip-flop, said second timing pulse setting any flip-flop wherein the preceding flip-flop has a prime signal on one of its output leads and resetting any flip-flop wherein the preceding flip-flop has an inhibit signal on said output lead; and means for applying the prime output signal of said last flip-flop to said first AND-gate and said second NOT-unit.

8. An apparatus controlling an automatically fed machine, said machine having a work-performing means and operating cycles and at least an input and an output station wherein workpieces are transported along a conveyance path so as to be fed into the input and the output stations, the combination comprising:

pulse generator means for generating a plurality of machine timing pulses, said pulse generator being operatively connected to said machine in timed relationship therewith;

first means for detecting the presence of each said workpiece at said input station, said first detecting means producing an output signal when such presence has been detected in coincidence with the input thereto of one of said timing pulses;

means for registering the presence of each said workpiece in said machine upon a coincidence of the input into said register means of the output signal from said first detecting means and one of said timing pulses, said register means producing at least an output signal for controlling said work performing means so as to perform work on each said workpiece in the event each said workpiece is being transported through said machine;

second means for detecting the feeding of each said workpiece into said output station and having means for producing a signal when detecting said feeding, said second detecting signal means producing an output signal when said feeding has been detected; and comparator means for producing at least a control signal on the coincident input thereto of an output signal from said register means and from said second detecting signal means, a said control signal energizing machine control means so as to permit the machine to continue to transport said workpieces along the conveyance path.

* * * * *